United States Patent

Round

[11] Patent Number: 5,353,513
[45] Date of Patent: Oct. 11, 1994

[54] COMBINATION FINGER AND RING SIZING DEVICE

[75] Inventor: Stephen A. Round, Foster, R.I.
[73] Assignee: S. Round's, Inc., North Scituate, R.I.
[21] Appl. No.: 85,625
[22] Filed: Jul. 6, 1993
[51] Int. Cl.⁵ .............................................. G01B 3/34
[52] U.S. Cl. ................................. 33/555.2; 33/514.1
[58] Field of Search .................. 33/512, 514.1, 555.1, 33/555.2, 555.3, 562, 563

[56] References Cited

U.S. PATENT DOCUMENTS

| | | | |
|---|---|---|---|
| 146,974 | 2/1874 | Allen | 33/514.1 |
| 447,475 | 3/1891 | Pomeroy | 33/555.2 |
| 1,212,279 | 1/1917 | Stone | 33/555.2 |
| 1,424,082 | 7/1922 | Clapton | 33/514.1 |
| 3,858,325 | 1/1975 | Goerler | 33/555.2 |
| 3,875,085 | 4/1975 | Atkins | 33/555.2 |
| 4,964,222 | 10/1990 | Keener | 33/544.4 |
| 5,170,570 | 12/1992 | Mays, Jr. | 33/563 |
| 5,253,427 | 10/1993 | Bartlett | 33/563 |

*Primary Examiner*—William A. Cuchlinski, Jr.
*Assistant Examiner*—G. Bradley Bennett
*Attorney, Agent, or Firm*—Salter & Michaelson

[57] ABSTRACT

A combination finger and ring sizing device consists of a planular plastic body having a first portion with a plurality of openings formed therein and a second elongated portion that is integrally joined with the first portion and that extends outwardly therefrom terminating in a free end. The openings in the first portion sequentially graduate in diametrical size and define graduated ring sizes. The openings are identified as to ring size by indicia imprinted adjacent to the openings. The elongated second portion is formed with a tapered configuration that extends away from the free end of thereof and it includes a plurality of imprinted indicia designating ring sizes.

2 Claims, 2 Drawing Sheets

COMBINATION FINGER AND RING SIZING DEVICE

BACKGROUND AND SUMMARY OF THE INVENTION

The instant invention relates to sizing devices, and more particularly to a sizing device for measuring the ring size of a finger and/or the shank size of a finger ring.

Finger sizing devices have heretofore been known in the art. For example, one known finger sizing device is disclosed in the U.S. Pat No. to Gardner No. 3,639,995. The Gardner device comprises a disc which is journalled in a two part casing. The disc carries a chain that is anchored to the exterior of the casing and to the disc within the casing so that the chain, when pulled out of the casing, is in the form of a loop through which a finger to be measured may be inserted. An arm connected to the disc has an external pointed indicator which aligns with size indicia on the exterior of the casing so that the ring size may be readily determined.

Nevertheless, it has been found that there are very few publicly available finger sizing devices which enable a person to quickly and easily determine the ring sizes of their fingers. In most cases where ring sizing is required, the person must go to a jeweler and have the jeweler determine their ring size with a set of metal ring size gauges. Alternatively, some mail order ring catalogs provide their customers with a square piece of cardboard having a plurality of sized openings formed therein. The user sequentially inserts a selected finger through the openings until a proper fit is obtained. However, it has been found that it is often difficult for the user to insert the selected finger through the openings because the fingers on either side of the selected finger must be bent backwardly out of the way for the selected finger to slide into the desired opening. When the fingers are bent back unnaturally, they push on the adjoining cardboard openings and tend to rip or tear the sizing device. Still further, bending the adjacent fingers backwardly can be extremely uncomfortable for a normal person and can be painful or even impossible for an elderly person or a person with arthritis. It has thus been found that the square cardboard finger sizing device is inadequate.

Ring shank sizing devices, such as the mandrel shown in the U.S. Pat. No. to Keener No. 4,964,222 have also been known in the art. However, these type of devices are usually not available to the public. In situations where it is desirable to know the shank size of a previously purchased finger ring, the owner must bring the ring to a jeweler who uses a tapered sizing mandrel. In use, the sizing mandrel is inserted into the ring shank to the innermost possible position wherein the sizing indicia on the mandrel adjacent to the position of the ring determines the size of the ring shank.

In addition, a combination finger and ring sizing device is disclosed in the U.S. Pat. No. to Leveridge No. 3,822,476. The sizing device comprises a casing containing operating members for measuring and indicating the measurements of fingers and rings to be fitted thereto. Although this type of device is effective in obtaining measurements, it is bulky, awkward to use and too costly for the public to purchase for the limited number of times that the purchaser may utilize the device.

The instant sizing device comprises a planular plastic body having a first portion with a plurality of openings formed therein and a second elongated portion that is integrally joined with the first portion and that extends outwardly therefrom terminating in a free end. The openings in the first portion sequentially graduate in diametrical size to define graduated ring sizes. The openings are identified as to ring size by indicia printed adjacent to the openings. The ring size of a selected finger is determined by inserting the selected finger through successive opening until a proper fit is obtained. The elongated second portion is formed with a tapered configuration that extends away from the free end thereof and has a plurality of indicia designating ring sizes imprinted thereon. The size of a shank of a selected finger ring is determined by mounting the ring shank on the tapered second portion and moving it to the innermost possible position at which the corresponding indicia indicates the size of the ring. Since the sizing device is formed from plastic, it is both lightweight and durable.

Accordingly, it is an object of the instant invention to provide a combination finger and ring sizing device.

It is another object to provide a lightweight and durable finger and ring sizing device that can be easily and inexpensively mailed to customers of mail order jewelry companies.

It is still another object to provide a simple and effective means for determining both the finger size of a selected finger and the size of the shank of a selected finger ring.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENTS

Figure 1:
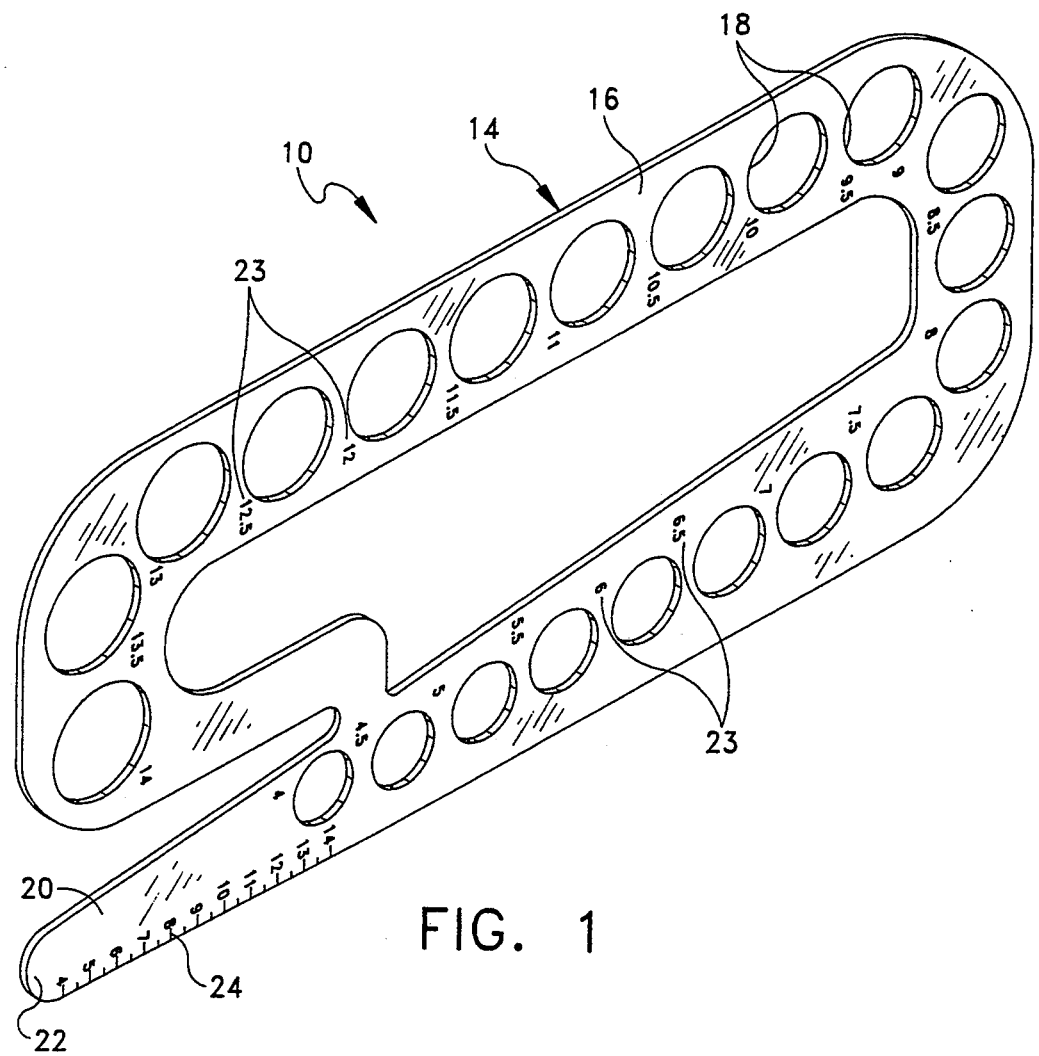
FIG. 1 is a perspective view of a first embodiment of the combination finger and ring sizing device of the instant invention.
Figure 2:
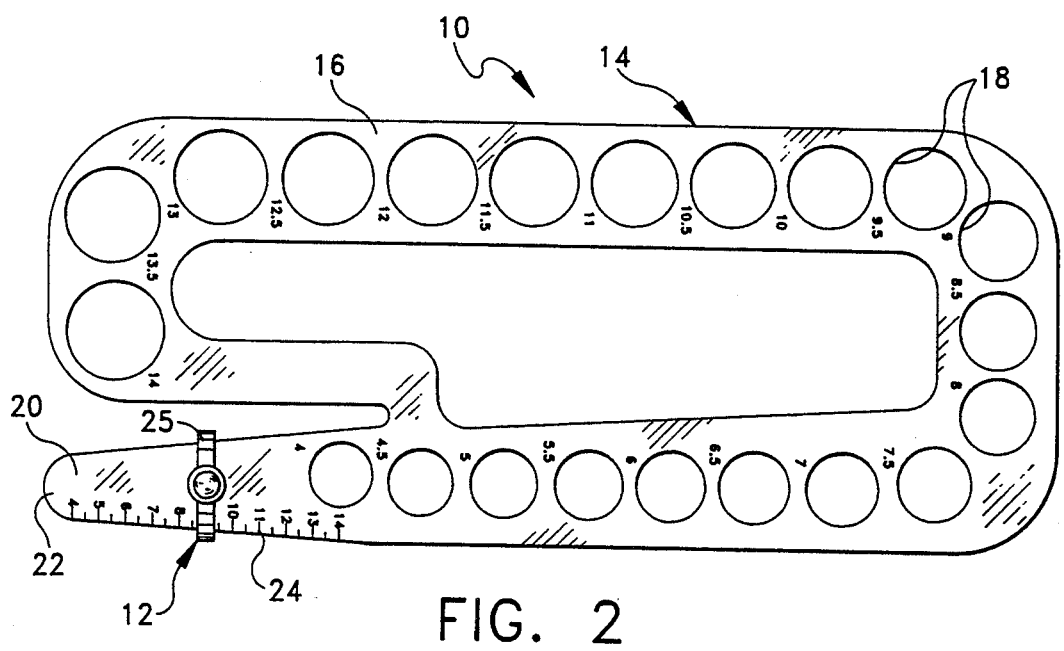
FIG. 2 is a plan view thereof.

Referring now to the drawings, a first embodiment of the combination finger and finger ring sizing device of the instant invention is illustrated and is generally indicated at 10 in FIGS. 1 and 2. As will hereinafter be more fully described, the instant sizing device 10 is operative for obtaining the ring size of a selected finger (not shown), and it is further operative for obtaining the shank size of a selected finger ring generally indicated at 12 in FIG. 2.

The first embodiment of the sizing device 10 comprises a planular body generally indicated at 14 which is preferably integrally stamped from a sheet of flexible plastic. The body 14 includes a first portion 16 having a plurality of openings 18 formed therein and a second elongated portion 20 that is integrally joined with the first portion 16 and that extends outwardly therefrom terminating in a free end 22. The first portion 16 comprises a strip of plastic which is angled to form a substantially square frame. Formed along the longitudinal centerline of the first portion 16 are the plurality of openings 18 which graduate in diametrical size to define whole and half ring sizes ranging from size 4 to size 14. The sizes of the openings 18 are identified by indicia 23 which are imprinted on the body 14 adjacent to the corresponding opening. The ring size of a selected finger is determined by inserting the selected finger in successive openings 18 until a proper fit is determined. It is pointed out that the strip configuration of the first portion 16 enables a finger to be easily inserted into any one of the openings 18 because an open area is provided on each side of the opening 18 thus allowing the sizing device 10 to be slipped over the users' finger much in the same way a conventional ring would fit.

The second elongated portion 20 is formed with an increasing tapered configuration that extends away from the free end 22. Ring size indicia 24 are imprinted on the tapered second portion 20 for designating whole and half ring sizes ranging from size 4 to size 14. To determine the size of a shank indicated at 25 in FIG. 2 of a selected finger ring 12, the shank 25 is slid over the free end 22 of the tapered second portion 20 and moved to the innermost possible position. The corresponding indicia 24 at the innermost position designates the size of the shank 25 of the ring 12 being measured.

Figure 3:
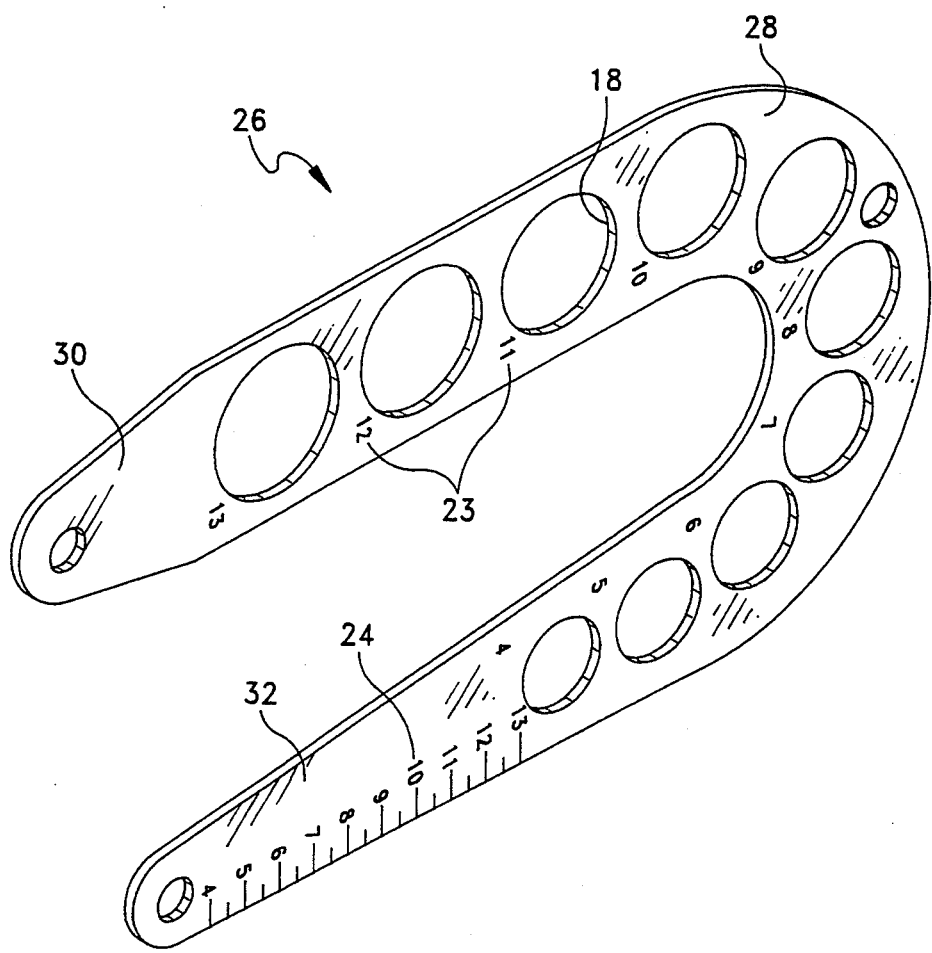
FIG. 3 is a perspective view of a second embodiment of the instant invention.
Figure 4:
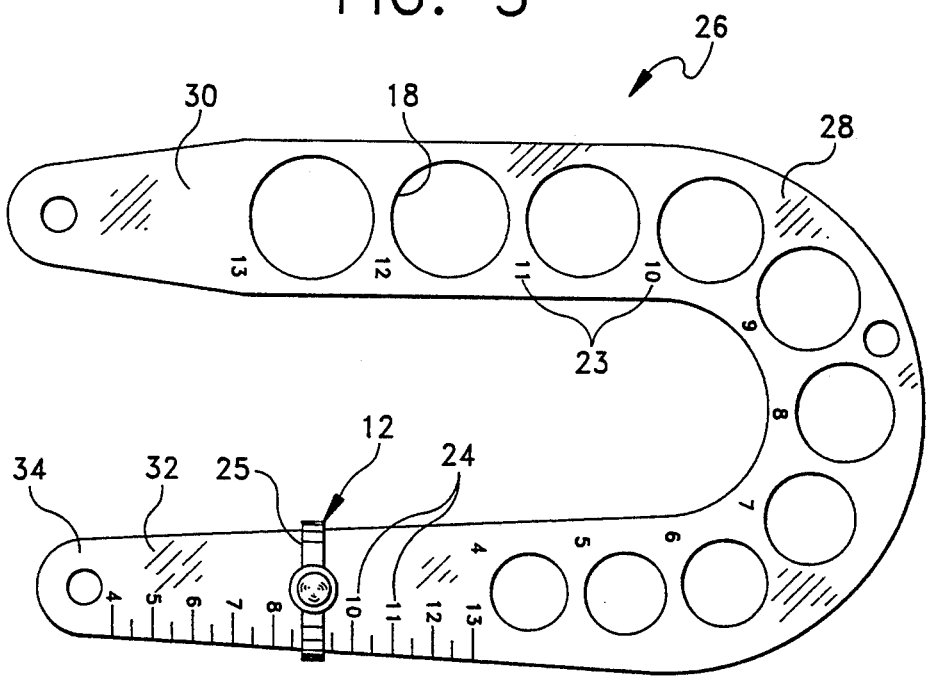
FIG. 4 is a plan view thereof.

Referring now to FIGS. 3 and 4, a second embodiment of the sizing device is illustrated and as generally indicated at 26. The second embodiment 26 is similar in construction to the first embodiment 10 except that the body 28 is slightly smaller is size and is formed in a U-shape having a first leg 30 and a second leg 32. The reduction in size is accomplished by eliminating the openings 18 for half ring sizes and the largest ring size 14 as provided in the first embodiment 10. The graduated openings 18 are formed along the centerline of the U-shaped body 28 and the terminal end 34 of the second leg 32 is tapered to provide the ring sizing portion of the device 26. Indicia 23 and 24 are provided on the body 28 for respectively indentifying the size of the openings 18 and ring sizes on the second leg 32. The second embodiment 26 is utilized in the same manner as the first embodiment 10 in order to obtain either a ring size for a selected finger or a shank size of a ring 12. It is again pointed out that the narrow strip configuration of the body 28 provides open areas on both sides of the openings 18 so that the sizing device 26 may be slipped over a finger without having to bend the adjacent fingers backwardly.

It is seen therefore, that the instant invention provides a unique and effective sizing device for determining both the ring size of a finger and the shank size of a finger ring. The device is simple in design, lightweight, inexpensive and easily manufactured using currently available technology. The planular plastic body makes it ideal for mail order and television shopping networks to easily and inexpensively mail the device to customers so that the customers may accurately size their fingers and order the proper size. The ability of the customer to accurately size his/her finger and order the proper size will save such companies and their customers substantial postage and handling charges for rings which are returned because they were originally ordered in the wrong size. It can therefore be seen that the instant invention provides a significant advantage to both the companies and their customers. For these reasons, it is believed that the combination finger and ring sizing device of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A finger and ring sizing device comprising a one-piece planular body that includes a first body portion that is defined by spaced narrow strips that are interconnected at adjacent ends thereof by a narrow interconnecting strip, a plurality of circular openings being formed in said narrow and interconnecting strips, said openings graduating in diametrical size and defining sequentially graduated ring sizes and being formed in said narrow strips so that each opening has open areas at the sides thereof, wherein any one of the openings in the first body portion is slidable over a selected finger without having to bend backwardly the fingers that are adjacent to said selected finger, said openings being identified as to ring size by indicia imprinted on said first body portion adjacent to said openings, wherein a user's ring size for said selected finger is obtained by the user inserting the selected finger in successive openings until a proper fit is obtained, thereby indicating the correct ring size for the selected finger, said body further including a second elongated body portion that is integrally joined to one of said narrow strips of said first body portion and that extends outwardly therefrom and terminating in a free end, said second elongated body portion being formed with an increasing tapered configuration that extends away from the free end thereof, and ring size indicia imprinted on said second tapered body portion for designating ring sizes, wherein the size of a shank of a selected finger ring is determined by mounting the ring shank on said second tapered body portion and moving it to the innermost possible position at which the corresponding indicia designates the size of the ring shank being measured.

2. The finger and ring sizing device as claimed in claim 1 said one-piece planular body being formed of a flexible plastic material.

* * * * *